United States Patent [19]

Katsuta

[11] Patent Number: 5,671,394
[45] Date of Patent: Sep. 23, 1997

[54] MICROCOMPUTER HAVING ROM DATA PROTECTION FUNCTION

[75] Inventor: Hiroshi Katsuta, Tokyo, Japan

[73] Assignee: NEC Corporation, Tokyo, Japan

[21] Appl. No.: 313,534

[22] Filed: Sep. 27, 1994

Related U.S. Application Data

[63] Continuation of Ser. No. 736,975, Jul. 29, 1991, abandoned.

[30] Foreign Application Priority Data

Jul. 27, 1990 [JP] Japan ................................. 2-199551

[51] Int. Cl.$^6$ .......................................... G06F 12/14
[52] U.S. Cl. ............................ 395/491; 395/188.01
[58] Field of Search .............................. 395/425, 491,
395/188.01; 371/21.1, 21.2; 340/825.31;
380/25

[56] References Cited

U.S. PATENT DOCUMENTS

| H714 | 11/1989 | McDowell | 395/800 |
|---|---|---|---|
| 4,228,424 | 10/1980 | Le Nay et al. | 340/506 |
| 4,450,560 | 5/1984 | Conner | 371/25.1 |
| 4,812,994 | 3/1989 | Taylor et al. | 364/464.02 |
| 4,937,855 | 6/1990 | McNab et al. | 379/103 |
| 5,014,191 | 5/1991 | Padgaonkar et al. | 395/490 |

FOREIGN PATENT DOCUMENTS 60-123948  7/1985  Japan .

OTHER PUBLICATIONS

"Microsoft Press® Computer Dictionary, 2nd. Ed."; MicroSoft Press, 1994 pp. 33 and 153.

Ravi Bhatnagar, "Microcomputer's memories solve testing and firmware problems," Electronic Design, Mar. 8, 1984, pp. 129–134.

*Primary Examiner*—Matthew M. Kim
*Assistant Examiner*—Reginald G. Bragdon
*Attorney, Agent, or Firm*—Whitham, Curtis, Whitham & McGinn

[57] ABSTRACT

A single-chip microcomputer includes a program ROM storing a program; a central processing unit executing the program read out from the program ROM for performing data processing; an external data input port for receiving data to be processed by the central processing unit, from an external device; and an external data output port for outputting data processed by the central processing unit to an external device. The program ROM also stores a test program for testing the program ROM and a plurality of bytes of collation information. The central processing unit has a test mode for executing the test program, and compares the plurality of bytes of collation information with a corresponding number of bytes of data sequentially input through the external input port. The central processing unit selects one of the plurality of bytes of collation information and compares the selected byte of collation information with one byte of data input through the external input port when the selected byte of collation information is selected. Only when the plurality of bytes of collation information are consistent with all the bytes of data sequentially inputted through the external input port will the central processing unit allow contents stored in the program ROM to be output through the external output port.

9 Claims, 8 Drawing Sheets

MICROCOMPUTER HAVING ROM DATA PROTECTION FUNCTION

CROSS-REFERENCE TO RELATED APPLICATION

This application is a continuation of application Ser. No. 07/736,975, filed Jul. 29, 1991, now abandoned.

BACKGROUND OF THE INVENTION

1. Field of the Invention

The present invention relates to a microcomputer including therein a read only memory (ROM), and more specifically to a microcomputer having a function of protecting the contents of a ROM.

2. Description of Related Art

Recently, microcomputers are widely used in various fields including office automation instruments and domestic instruments. In the instruments or systems incorporating a microcomputer, it is possible to copy the system by analyzing or copying a program describing a control sequence of the system. On the other hand, in systems such as IC cards (chip card) and POS (point of sales) system, which handle money information and individual information, there is a possibility that the system may be used by an unauthorized person by analyzing the program.

The above mentioned problems concerning information security has recently become more and more unimportant, and it has become indispensable to realize a system capable of completely protecting the right and interest of a proper proprietor.

In order to solve the above mentioned problems, it is an ordinary practice to store a program in a ROM internally provided in the microcomputer, and to inhibit a reading of the content of the ROM to an external terminal. In this case, it is necessary to provide a test mode for testing a large scale integrated (LSI) circuit chip and analyzing the LSI chip when a defect is found, and to allow the content of the ROM to be read out to the external terminal only in the test mode. Furthermore, it is necessary to internally provide a function of protecting the read-out data.

A system currently used for protecting the ROM data includes a password system in which an internal special data is compared with a cipher code inputted from the external terminal, and a data output is controlled on the basis of the result of the comparison, and an encryption system in which the ROM data is encrypted.

The password system is disclosed in, for example, Japanese Patent Application Laid-open No. 60-123948, in which a mask ROM is connected through an output buffer to an external terminal, and on the other hand, a control code memory is provided to be written with control codes ordered or determined at the same time as a content of the mask ROM is ordered. A code designation memory is connected to the external terminal so that the code designation memory stores a code inputted through the external terminal. A code comparator compares a content of the control code memory with a content of the code designation memory, and when the content of the control code memory is consistent with the content of the code designation memory, the code comparator outputs an active control signal to the output buffer, so that the output buffer is brought into an output allowance condition. If the content of the control code memory is not consistent with the content of the code designation memory, the code comparator renders the control signal inactive, so that the output buffer is put in an output inhibition condition.

With the above mentioned arrangement, unless the same code as a predetermined code is given from an external device before reading out the content of the ROM, it is impossible to read out the content of the ROM to the external terminal.

In general, however, the password system is difficult to give a high degree of security. For example, in the above mentioned prior art protection system of the password type, since a simple code comparison is executed only one time, the level of protection is low. In this case, even if the code length or bit length is elongated, an increase of the protection level corresponding to an increase of hardware in the code designation memory and the code comparator cannot be obtained.

As a means for solving the above mentioned problems, it is considered to use an encryption system. In this case, however, a hardware exclusively used for encryption and decryptment is required. In addition, it is possible to provide different encryption rules for all users who order the ROM code. Accordingly, it is not suitable to a generalized use.

SUMMARY OF THE INVENTION

Accordingly, it is an object of the present invention to provide a ROM data protection system which has overcome the above mentioned defect of the conventional one.

Another object of the present invention is to provide a microcomputer having a ROM data protection system which has overcome the above mentioned defect of the conventional one, and which gives a high degree of protection with a minimum amount of hardware.

The above and other objects of the present invention are achieved in accordance with the present invention by a microcomputer including a program read only memory storing a program; a central processing means executing the program read out from the program read only memory for a data processing; an external data input means receiving data to be processed by the central processing means, from an external device; and an external data output means for outputting the data processed by the central processing means to an external device. The program read only memory also stores a test program for testing the program read only memory and a plurality of items of collation information. The central processing means has a test mode in which the central processing means executes the test program, and compares all the plurality of items of collation information with a corresponding number of items of data sequentially inputted through the external input means, by selecting one of the plurality of items of collation information and comparing the selected item of collation information with one item of data inputted through the external input means when the selected item of collation information is selected. Only when all the plurality of items of collation information are consistent with all the items of data sequentially inputted through the external input means, the central processing means allows all contents stored in the program read only memory to be outputted through the external output means.

The above and other objects, features and advantages of the present invention will be apparent from the following description of preferred embodiments of the invention with reference to the accompanying drawings.

DESCRIPTION OF THE PREFERRED EMBODIMENTS

Figure 1:
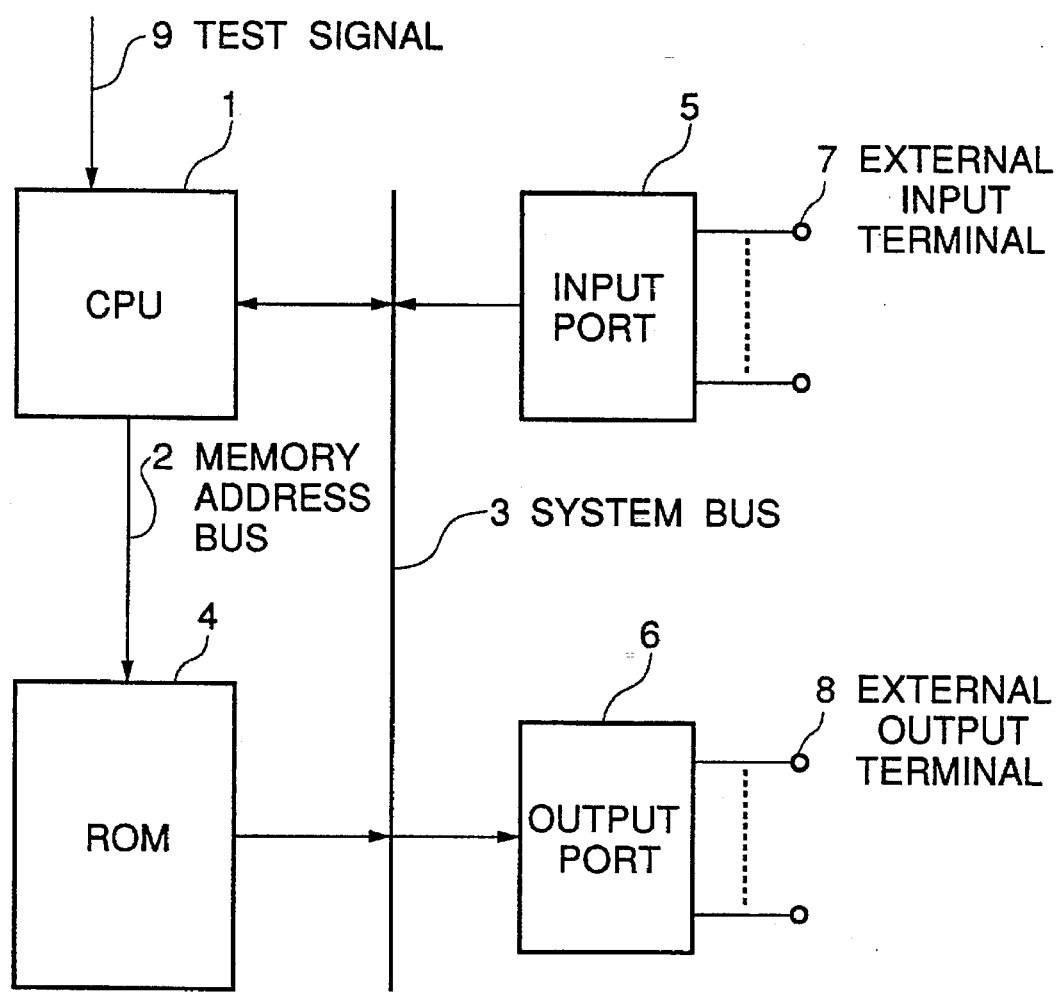
FIG. 1 is a block diagram of a single-chip microcomputer capable of embodying the ROM data protection system of the present invention.

Referring to FIG. 1, there is shown a block diagram of a single-chip microcomputer capable of embodying the ROM data protection system of the present invention.

A CPU (central processing unit) 1 outputs a memory address through a memory address bus 2 to a ROM (read only memory) 4, and reads an instruction code through a system bus 3 from the ROM 4 so as to execute a given instruction such as a data transfer and an arithmetic and logic operation. An input port 5 is connected to the system bus 3, and also connected to external input terminals 7. This input port 5 is composed of an input buffer used when the CPU 1 reads through the system bus 3 the data inputted from the external input terminals 7. On the other hand, an output port 6 is connected to the system bus 3, and also connected to external output terminal 8. This output port 6 is composed of a data latch for temporarily holding data and an output buffer, which are used when the CPU 1 outputs data through the system bus 3 to the external output terminals 8.

The ROM 4 is a mask ROM storing a user program. The ROM 4 receives through the memory address bus 2 the addresses sequentially outputted from the CPU 1 in accordance with progress of instruction execution in the CPU 1, and sequentially outputs instruction codes designated by the received addresses, to the system bus 3. The CPU 1 reads the instruction codes sequentially outputted on the system bus 3, and sequentially executes the received instructions.

Figure 2:
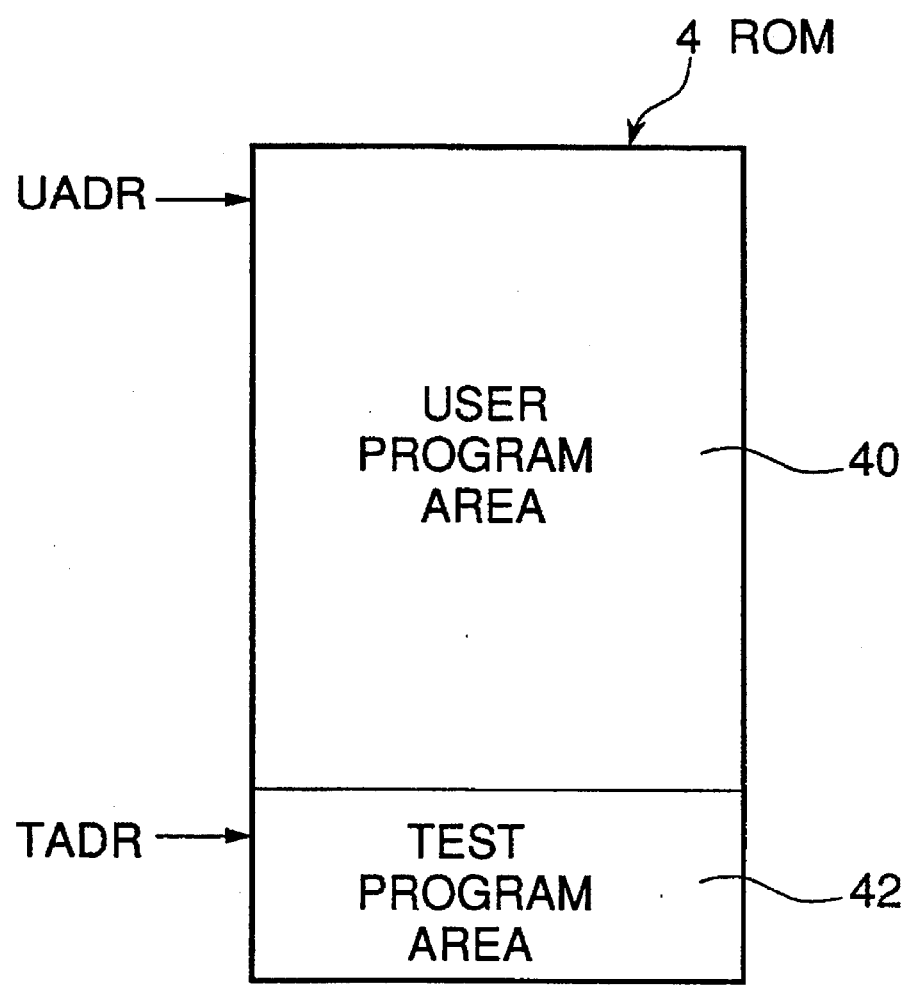
FIG. 2 illustrates an address map of the ROM incorporated in the microcomputer shown in FIG. 1.

Referring to FIG. 2, a memory map of the ROM 4 is illustrated. The ROM 4 includes a user program area 40 starting from an address UADR and for storing a user program, and a test program area 42 starting from an address TADR and for storing a program which outputs all the codes stored in the ROM 4 through the output port 6 when the ROM 4 is to be tested.

Here, after the CPU resets the system, if the CPU releases the reset condition when the CPU 1 shown in FIG. 1 is in receipt of a test signal 9 of a logical value "0", the CPU initializes a start address to "UADR" for execution of instructions. On the other hand, after the CPU resets the system, if the CPU releases the reset condition when the CPU 1 shown in FIG. 1 is in receipt of the test signal 9 of a logical value "1", the CPU initializes the start address to "TADR" for execution of instructions.

Figure 3:
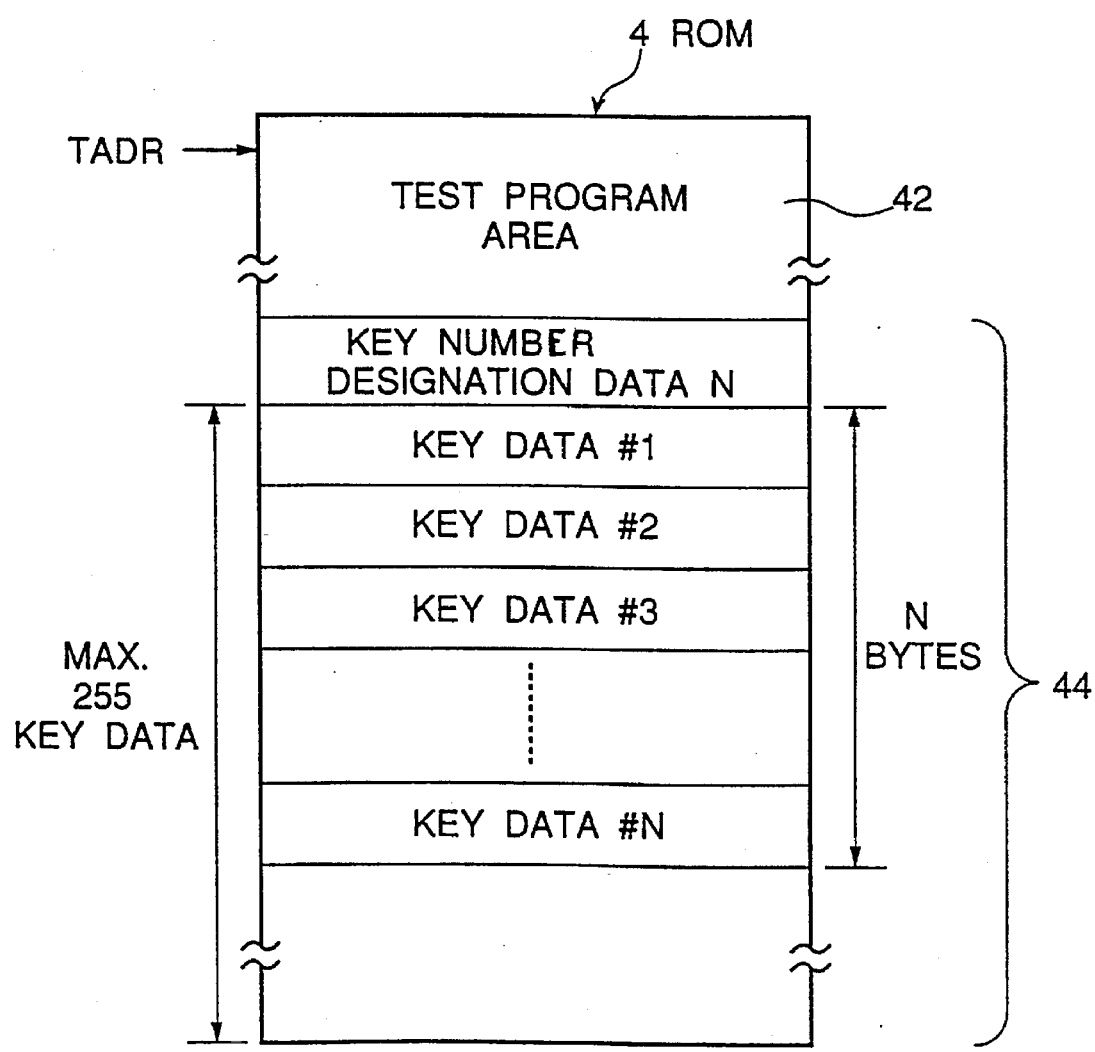
FIG. 3 illustrates a user designated area in a test program region of the ROM incorporated in the microcomputer shown in FIG. 1 in a first embodiment of the present invention.

As shown in FIG. 3, the test program area 42 are allocated with key data of N bytes which can be freely and individually determined or set when a user orders a ROM code, and a key number designation data "N" of one byte designating the number of bytes of the key data. The key data can be set to 255 bytes at maximum. Therefore, in the test program area, a user designated data area 44 of 256 bytes (including the key data area of 255 bytes and the key number designation data N of one byte) is reserved. Accordingly, the user orders ROM codes for not only the primary user program area 40 but also the user designated data area 44 included in the test program area 42.

Figure 4:
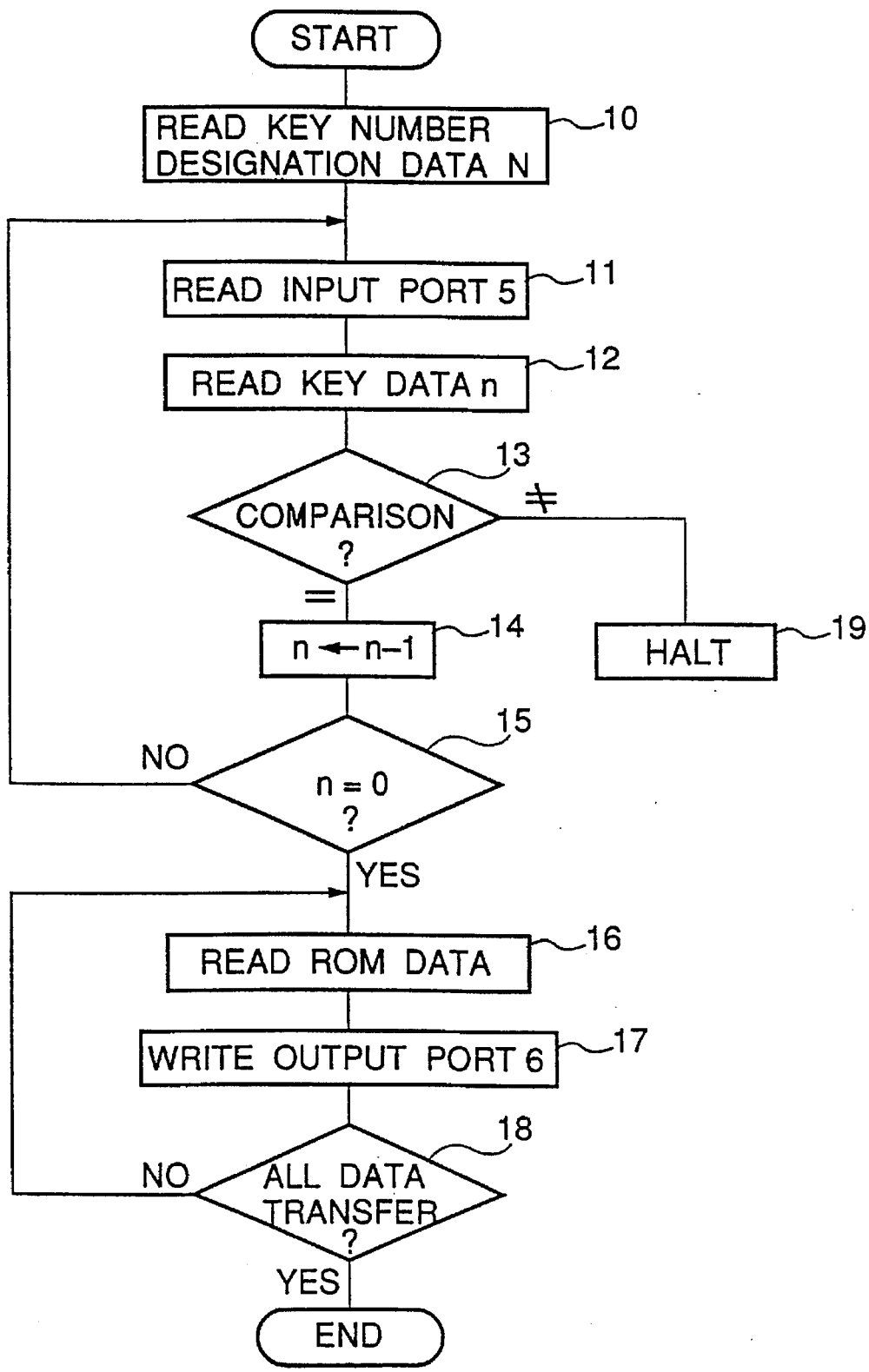
FIG. 4 is a flow chart of a test program in the first embodiment of the present invention.

Now, a processing of the above mentioned test program will be described with the flow chart of FIG. 4.

First, the key number designation data "N" is read out, and then, is set to an internal variable "n" (not shown) for the program processing (step 10). Thereafter, external input data is read out from the input port 5 (step 11), and the key data #1 is also read (step 12), so that the external input data and the key data #1 are compared (step 13). If coincidence is found, the internal variable "n" is decremented by "1" (step 14), and if the result of the decrement is not "0" (zero), the operation is branched or returned to the step 11 (step 15). Similarly, the operation from the step 11 to the step 14 is repeated for the key data #2 and the succeeding key data, until the decremented result of the internal variable "n" becomes "0".

In the step 13, on the other hand, if the external input data is not consistent with the key data, a halt instruction is executed for stopping the operation of the CPU 1 (step 19). As a result, the execution of the succeeding test program is stopped.

In the step 15, if the decremented internal variable "n" is "0" (zero), it is judged that all the key data collation has been properly and duly executed, and then, all the contents of the ROM 4 including the user program area are read out (step 16), and the read-out data is transferred or written to the output port 6 (step 17). If all the data of the ROM has been transferred, the processing based on the test program is completed (step 18).

In an ordinary operation executed when the test signal 9 is at the logic value "0", it is not allowed to execute the instruction by inputting an instruction code from an external device. Therefore, it is not possible to output the content of the ROM 4 to the external device, other than to execute the user program. On the other hand, in the test mode in which the test signal 9 is at the logic value "1", the above mentioned test program is executed. A sequence of key or collation data previously designated by the user is inputted through the external input terminals 7 from an external device such as an LSI tester, so that all the sequence of collation data inputted from the external device is compared with a sequence of key data #1 to #N internally stored, and if all data is consistent, all the data of the ROM 4 is outputted from the external output terminals 8 so that the ROM 4 is tested.

Figure 5:
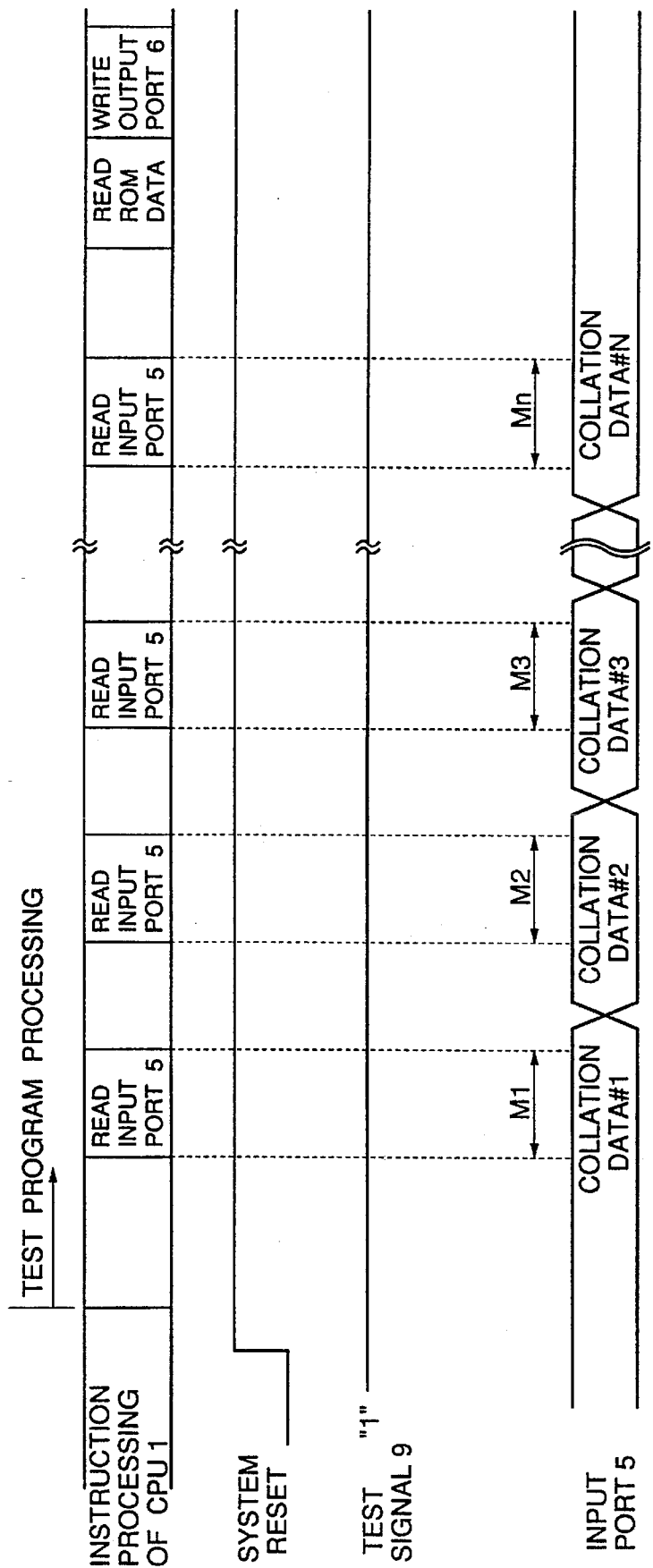
FIG. 5 is a timing chart of the test program in the first embodiment of the present invention.

Referring to FIG. 5, there is illustrated an operation timing of the test program. In the timing chart shown in FIG. 5, if a system reset signal of an active-low type is cancelled under a condition in which the test signal 9 is set to "1", the test program is started. A timing for reading an external input data from the input port 5 in this program processing (step 11) is designated by M1, M2, M3, . . . Mn, for the key data of N bytes, respectively.

Therefore, when collation data #1, #2, #3, . . . #n are inputted through the external input terminals 7 from an LSI tester or other device in the test of the ROM 4, it is necessary to input the collation data #1, #2, #3, . . . #n in time with the timings M1, M2, M3, . . . Mn, respectively. Therefore, the switching or changing timing of the collation data is defined by an instruction execution timing of the test program in the CPU 1.

In the first embodiment, it is possible to set the key data of 255 bytes at maximum. However, it is possible to set the key data of an arbitrary byte number in accordance with a byte capacity of the ROM which is allowed to be used for the test program, and a desired level of protection.

Now, a second embodiment of the present invention will be described. The second embodiment is characterized in that, in the test program for testing the content of the ROM 1 in the single-chip microcomputer of the first embodiment, a plurality of items of key data are sequentially compared or collated with a corresponding number of items of input data supplied through the input port 5 from an external device at a timing which can be arbitrarily set. Accordingly, the same microcomputer as that used in the first embodiment and therefore shown in FIG. 1 is used in the second embodiment. Therefore, the detailed description of the microcomputer will be omitted.

Figure 6:
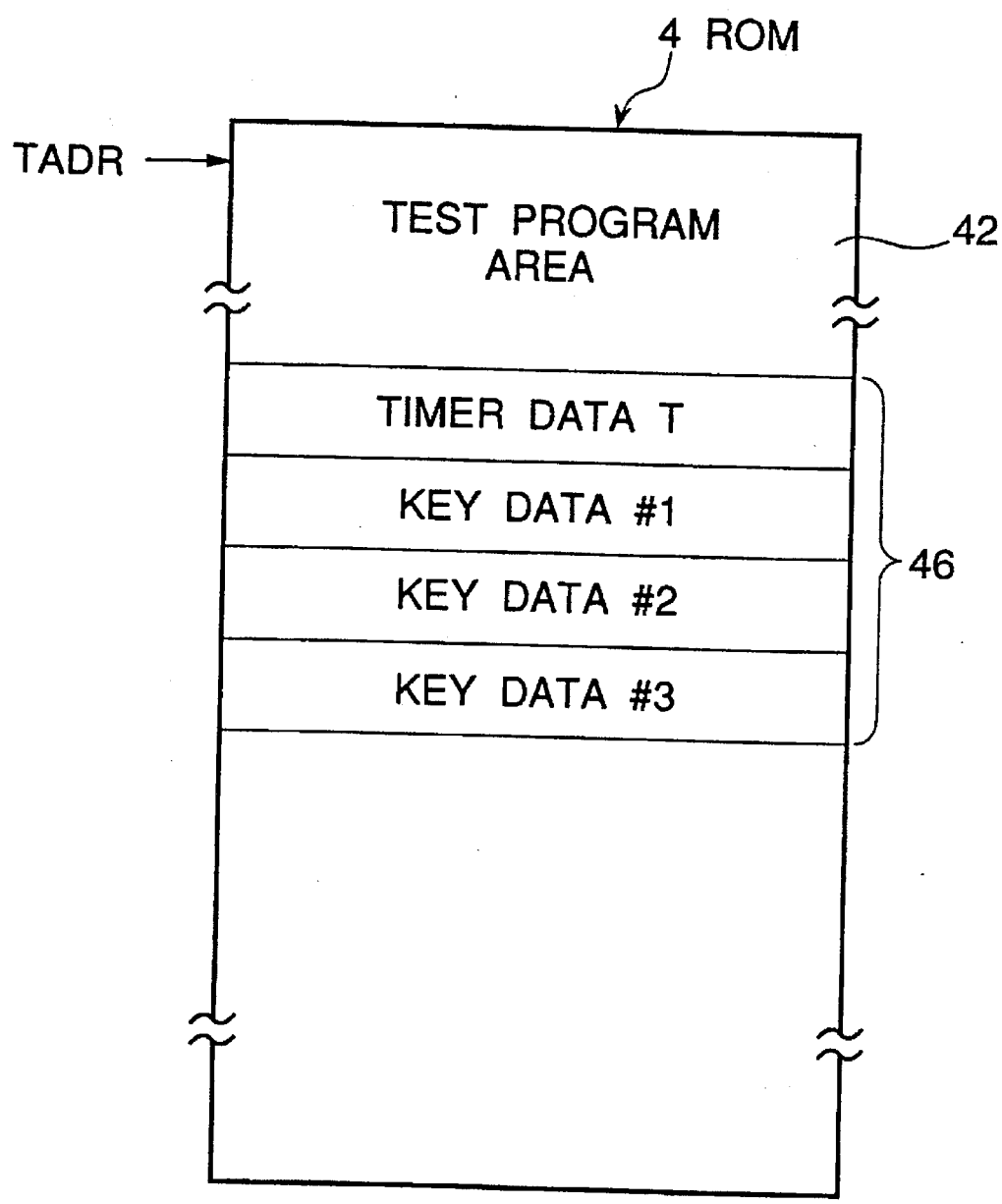
FIG. 6 illustrates a user designated area in a test program region of the ROM incorporated in the microcomputer shown in FIG. 1 in a second embodiment of the present invention.

As shown in FIG. 6, the test program area of the ROM 4 in the second embodiment is allocated with key data of three bytes which can be freely and individually determined or set when a user orders a ROM code, and a timer data "T" of one byte designating a timing of execution of the test program. Therefore, in the test program area, a user designated data area 46 of 4 bytes is reserved. Accordingly, the user orders ROM codes for not only the primary user program area 40 but also the user designated data area 46 included in the test program area 42.

Figure 7:
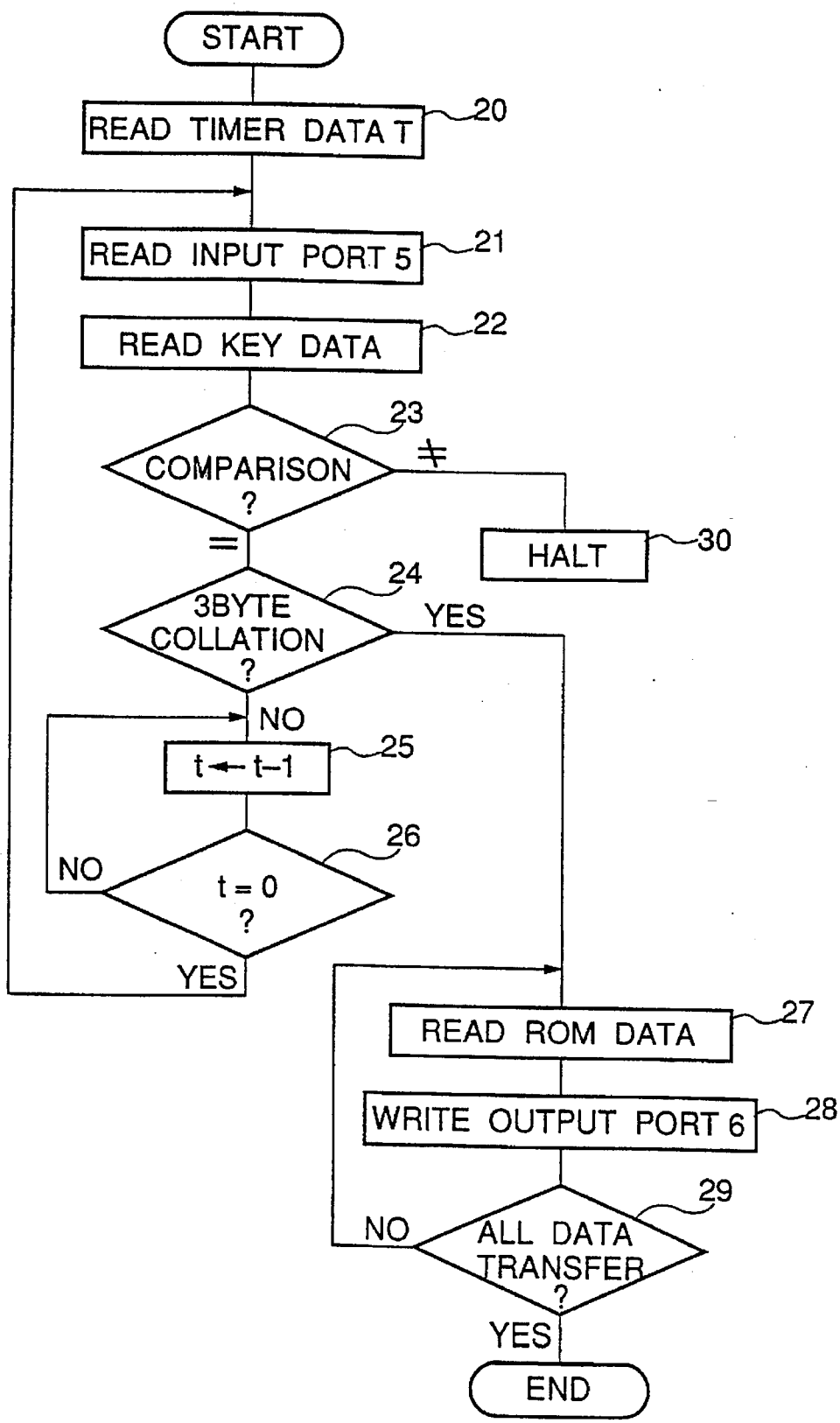
FIG. 7 is a flow chart of a test program in the second embodiment of the present invention.

Now, a processing of the test program in the second embodiment will be described with the flow chart of FIG. 7.

First, the timer data "T" is read out (step 20), and then, is set to an internal variable "t" (not shown) for the program processing. Thereafter, external input data is read out from the input port 5 (step 21), and the key data #1 is also read (step 22), so that the external input data and the key data #1 are compared (step 23). If coincidence is found in the step 23, whether or not all the key data of the three bytes have been compared is checked (step 24). In the step 24, it is detected that the comparison or collation of all the key data of the three bytes has not yet been completed, the internal variable "t" is decremented by "1" (step 25). This decrement is repeated until the result of the decrement becomes "0" (zero) (step 26). If the result of the decrement is "0" (zero), the operation is branched to the step 21. Similarly, the operation including the setting of the internal variable "t" and from the step 21 to the step 26 is repeated for the key data #2 and the succeeding key data #3.

Here, if the external input data is not consistent with the key data in the step 23, a halt instruction is executed for stopping the operation of the CPU 1 (step 30). As a result, the execution of the succeeding test program is stopped.

In the step 24, if the comparison or collation of all the key data of the three bytes has been completed, it is deemed that all the key data collation has been properly and duly executed, and then, all the contents of the ROM 4 including the user program area is read out (step 27), and the read-out data is transferred or written to the output port 6 (step 28). If all the data of the ROM has been transferred, the processing based on the test program is completed (step 29).

Similarly to the single-chip microcomputer of the first embodiment, in an ordinary operation executed when the test signal 9 is at the logic value "0", it is not allowed to execute the instruction by inputting an instruction code from an external device and therefore, it is not possible to output the content of the ROM 4 to the external device, other than to execute the user program. On the other hand, in the test mode in which the test signal 9 is at the logic value "1", the above mentioned test program is executed. The key or collation data of three bytes individually previously designated by the user is inputted through the external input terminals 7 from an external device such as an LSI tester, so that all the collation data inputted from the external device is compared with all the data stored in the ROM, and if coincidence of all data is found, all the data of the ROM 4 is outputted from the external output terminals 8 for the testing of the ROM 4.

Figure 8:
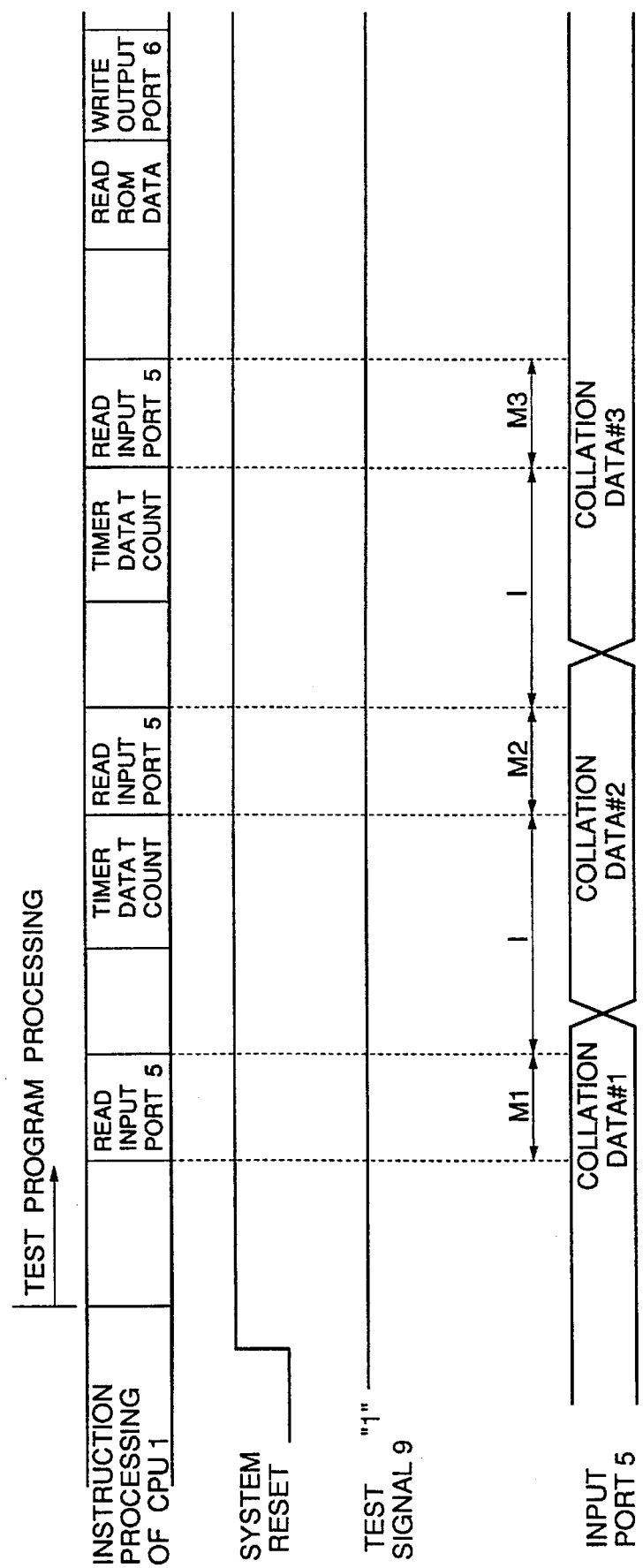
FIG. 8 is a timing chart of the test program in the second embodiment of the present invention.

Referring to FIG. 8, there is illustrated an operation timing of the test program in the second embodiment. In the timing chart shown in FIG. 8, if a system reset signal of an active-low type is cancelled under a condition in which the test signal 9 is set to "1", the test program is started. A timing for reading an external input data from the input port 5 in this program processing (step 21) is designated by M1, M2 and M3 for the key data of three bytes, respectively. Each interval between each pair of adjacent ones of the timings M1, M2 and M3 is designated by "T". This interval "T" is defined by using the set value of the timer data "T" as a variable, and ensured by the counting processing in the steps 25 and 26.

Therefore, when collation data is inputted through the external input terminals 7 from an LSI tester or others in the test of the ROM 4, it is necessary to input the collation data in time with the timings M1, M2 and M3, respectively. Therefore, the switching or changing timing of the collation data is defined with the interval "T", the value of which is arbitrarily set by setting a value of the timer data "T".

In the second embodiment, it is possible to set the key data of three bytes. However, it is possible to set the key data of an arbitrary byte number in accordance with a byte capacity of the ROM which is allowed to be used for the test program, and a desired level of protection.

As seen from the above description of the embodiments, the ROM data protection system in accordance with the present invention is characterized in that when the ROM of the single-chip microcomputer is tested, it is necessary, before the testing, to previously supply a plurality of items (or bytes) of collation information while switching or changing at a predetermined timing or interval, and only when all the of items of collation information are completely consistent with a plurality of items (or bytes) of internal key information, the ROM data is allowed to be outputted to the external output terminals. Therefore, it is possible to obtain protection of a level which is remarkably higher than the prior art password system in which only a simple data comparison is executed.

In addition, when a user orders ROM codes, it is possible to individually freely determine or set the collation information and the processing variables used in the collation or comparison, and also, it is easy to modify and change the collation information and the processing variables. Therefore, the present invention has a high degree of advantage in a practical use.

Furthermore, since the collation is realized by utilizing existing hardware resources including the CPU and the input/output ports which are internally provided in the microcomputer, without using a special additional hardware, the one-chip microcomputer in accordance with the present invention is inexpensive.

The invention has thus been shown and described with reference to the specific embodiments. However, it should be noted that the present invention is in no way limited to the details of the illustrated structures but changes and modifications may be made within the scope of the appended claims.

I claim:

1. A microcomputer for restricting access to proprietary data stored in a read only memory (ROM) from an unauthorized user, comprising:

read only memory (ROM) for storing proprietary data;

a central processing unit (CPU) connected to said ROM;

a plurality of data keys stored in said ROM along with said proprietary data;

an input port connected to said CPU for sequentially inputting a plurality of collation data from a user attempting to access the proprietary data stored in said ROM, said CPU reading ones of said plurality of collation data at said input port at a predetermined timing interval and collating said ones of said plurality of collation data with one of said plurality of data keys; and an output port for outputting the proprietary data in said ROM if all of said plurality of collation data matches all of said plurality of data keys after collation.

2. A microcomputer for restricting access to proprietary data stored in a read only memory (ROM) from an unauthorized user as recited in claim 1, further comprising a timing data stored in said ROM for determining the period of said predetermined time interval.

3. A microcomputer for restricting access to proprietary data stored in a read only memory (ROM) from an unauthorized user as recited in claim 1, further comprising a key number data stored in said ROM for indicating a number of said data keys stored in said ROM.

4. A microcomputer comprising:

a read only memory, connected to a system bus, for storing a user program, a test program and a plurality of key data;

a central processing unit, connected to said system bus, for reading said user program and for executing said user program by performing data processing operations and outputting processed data;

an input port, coupled to said system bus and a set of input terminals, for fetching external data at said set of input terminals and for outputting said external data to said central processing unit;

an output port, connected to said system bus and a set of output terminals, for outputting said processed data from said central processing unit to said set of output terminals; and means for causing said central processing unit to execute said test program, wherein, when said central processing unit executes said test program, said central processing unit accesses said input port a plurality of times at predetermined timing intervals, said timing intervals being predetermined prior to execution of the test program, for collating a different one of said key data with the external data fetched by said input port each time said input port is accessed, wherein, when any one of the external data is different from a collated one of said key data, said user program is inhibited from reading said read only memory and outputting to said output port, and when all the external data are coincident with all said key data, said user program is allowed access to said read only memory and outputs to said output port.

5. The microcomputer as claimed in claim 4, wherein said central processing unit receives first and second signals and executes said user program when said first signal changes from a first level to a second level while said second signal is at a first logic state, and executes said test program when said first signal changes from said first level to said second level while said second signal is at a second logic state.

6. The microcomputer as claimed in claim 5, wherein said first signal comprises a system reset signal and said second signal comprises a test signal.

7. A microcomputer, comprising:

a read only memory, connected to a system bus, for storing a user program, a test program, a plurality of key data and a timing data;

a central processing unit, connected to said system bus, having a normal operation mode and a test mode operation mode, said central processing unit for executing, in said normal operation mode, said user program by performing data processing operations and outputting processed data;

an input port, coupled to said system bus and a set of input terminals and being controlled by said central processing unit, for fetching external data at said set of input terminals and for outputting said external data; and an output port coupled to said system bus and a set of output terminals, said output port being controlled by said central processing unit for outputting said processed data to said set of output terminals, said central processing unit executing, in said test mode, said test program, said test program controlling said input port for fetching the external data at said set of input terminals a plurality of times, at timing interval determined prior to execution of said test program by said timing data in a sequence including a series of said timing intervals, and collating the external data fetched by said input port with a different one of said key data each time said input port is accessed, wherein, when any one of the external data fetched by said input port is inconsistent with a collated one of said key data, said user program is prevented from reading said read only memory and outputting to said output port, and when all the external data are consistent with all said key data, said user program is allowed access to said read only memory and allowed to output to said output port.

8. A method for restricting access to proprietary data stored in a read only memory (ROM) from unauthorized users, comprising the steps of:

storing a plurality of data keys in a ROM, said plurality of data keys comprising a plurality of bytes of data stored in a predetermined order;

presenting to an input port a plurality of user key data in a predetermined order;

accessing said input port at a predetermined timing interval to read said user key data;

reading one of said plurality of data keys in said predetermined order;

collating said user key data read from said input port with said one of said plurality of data keys to form a collated pair;

comparing the collated pair to determine a match;

repeating said steps of accessing, reading, collating and comparing for each of said plurality of data keys while said collated pair match; and outputting the proprietary information stored in said ROM provided said plurality of user key matches said plurality of data keys when collated.

9. A method for restricting access to proprietary data stored in a read only memory (ROM) from unauthorized users as recited in claim 8 further comprising the step of storing in the ROM a timing data for controlling said predetermined timing interval in said accessing step.

* * * * *